(12) United States Patent
Suzuki

(10) Patent No.: US 7,852,948 B2
(45) Date of Patent: Dec. 14, 2010

(54) MOVING PICTURE REAL-TIME COMMUNICATIONS TERMINAL, CONTROL METHOD FOR MOVING PICTURE REAL-TIME COMMUNICATIONS TERMINAL, AND CONTROL PROGRAM FOR MOVING PICTURE REAL-TIME COMMUNICATIONS TERMINAL

(75) Inventor: Haruyoshi Suzuki, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 1224 days.

(21) Appl. No.: 11/442,334

(22) Filed: May 30, 2006

(65) Prior Publication Data

US 2006/0268300 A1    Nov. 30, 2006

(30) Foreign Application Priority Data

May 27, 2005    (JP)    ............... 2005-156224

(51) Int. Cl.
*H04N 7/12*    (2006.01)
*G09G 5/02*    (2006.01)

(52) U.S. Cl. .............................. 375/240.26; 348/240.2; 345/604

(58) Field of Classification Search ............ 375/240.26, 375/240.28, 240.2, 240.02; 359/464; 348/461; 345/603, 604
See application file for complete search history.

(56) References Cited

U.S. PATENT DOCUMENTS

| | | | | |
|---|---|---|---|---|
| 5,493,339 | A * | 2/1996 | Birch et al. .................. | 348/461 |
| 2004/0218269 | A1 * | 11/2004 | Divelbiss et al. ............. | 359/464 |
| 2005/0123058 | A1 * | 6/2005 | Greenbaum et al. .... | 375/240.28 |

FOREIGN PATENT DOCUMENTS

| | | |
|---|---|---|
| JP | 07-193838 A | 7/1995 |
| JP | 2002-77857 A | 3/2002 |
| JP | 2003-235057 A | 8/2003 |
| JP | 2005-064785 A | 3/2005 |
| WO | 2004/010703 A1 | 1/2004 |

OTHER PUBLICATIONS

Notice of Reasons for Rejection, dated Oct. 21, 2010, issued in corresponding JP Application No. 2005-156224, 7 pages in English and Japanese.

* cited by examiner

*Primary Examiner*—Gims S Philippe
(74) *Attorney, Agent, or Firm*—Sughrue Mion, PLLC

(57) ABSTRACT

The moving picture real-time communications terminal comprises: an input unit which inputs an RGB video image signal; a conversion unit which converts the RGB video image signal into a YUV video image signal including Y, U and V video image signals; a compression and encoding unit which digitally converts the YUV video image signal outputted from the conversion unit into moving picture data, and compresses and encodes the moving picture data; a communications unit which sends and receives the moving picture data compressed and encoded by the compression and encoding unit, in real time, to and from a communications terminal of another party connected through a network; a bandwidth estimation unit which estimates change in a bandwidth of the network; a switching circuit which connects and disconnects output paths of the U and V video image signals from the conversion unit to the compression and encoding unit; and a switching control unit which disconnects the output paths of the U and V video image signals by operating the switching circuit, in response to the change in the bandwidth estimated by the bandwidth estimation unit, wherein the compression and encoding unit increases a bit rate of compression and encoding of the Y signal, in accordance with disconnection of the output paths of the U and V video image signals.

4 Claims, 3 Drawing Sheets

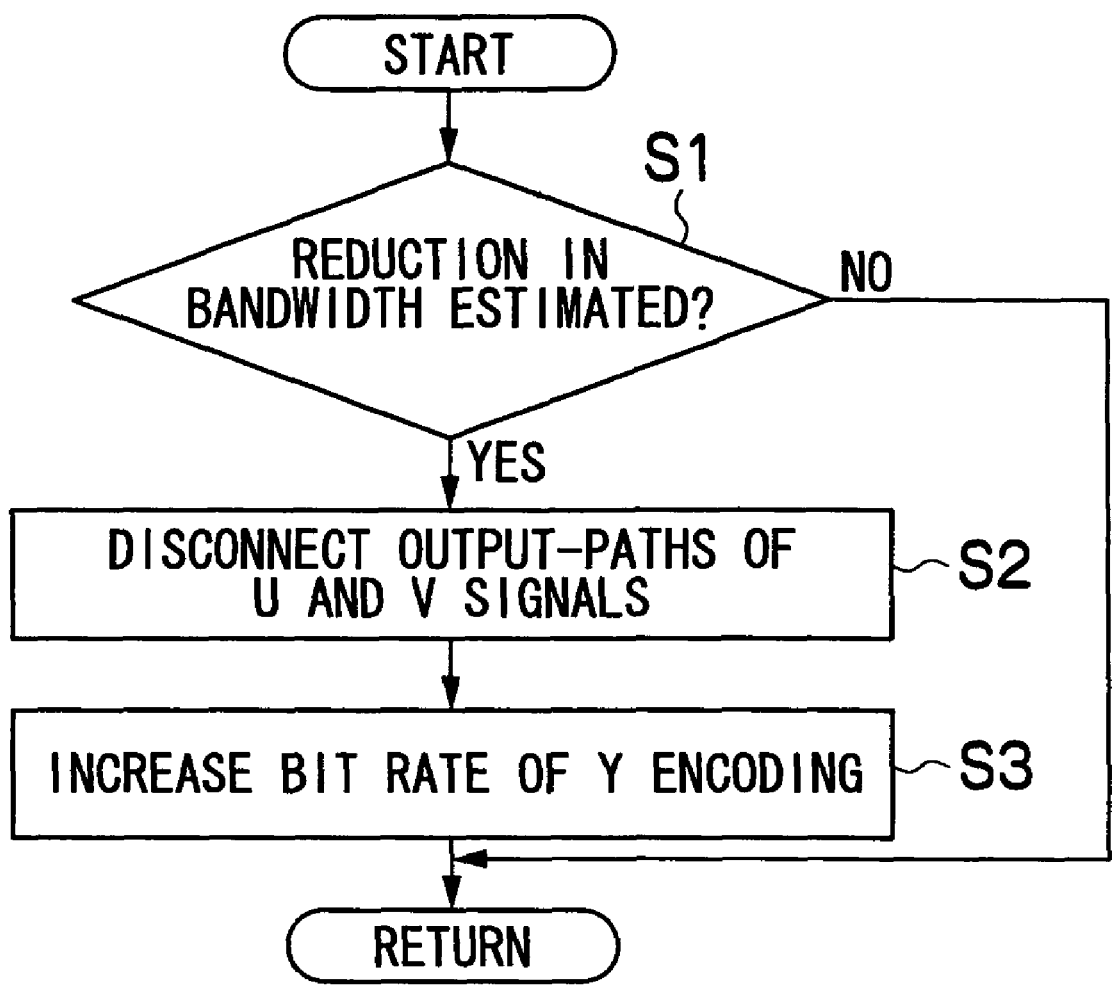

MOVING PICTURE REAL-TIME COMMUNICATIONS TERMINAL, CONTROL METHOD FOR MOVING PICTURE REAL-TIME COMMUNICATIONS TERMINAL, AND CONTROL PROGRAM FOR MOVING PICTURE REAL-TIME COMMUNICATIONS TERMINAL

BACKGROUND OF THE INVENTION

1. Field of the Invention

The present invention relates to moving-picture communication, and more particularly to moving-picture communication through a network of varying bandwidth, and to technology which ensures prescribed image quality by switching between color moving pictures and black and white moving pictures.

2. Description of the Related Art

In moving-picture communication, various technologies have been developed for dynamically adjusting the transmitted data volume in accordance with the bandwidth of the network environment. For example, Japanese Patent Application Publication No. 2002-77857 discloses that re-sequencing and/or selection of the data of respective elements in multimedia data is carried out on the basis of network information relating to the bandwidth, and the corresponding results are stored temporarily in a buffer. The transmission engine processes the multimedia data in accordance with these results, and, for example, omits frames from the video image data, when sending the data to the user terminal.

When video images are exchanged mutually in real time between terminals which are connected through a communications network, such as that in a video telephone and a video conferencing system, there may be a problem in that the video image data has missing frames or the frame rate is lowered if image quality is prioritized (in other words, maintaining a high compressed bit rate in each frame unit). For example, in a video telephone for sign language as used by persons with hearing difficulties, the facial expression and the manual gestures of the other communicating party are important, and if the observer sees a video image of the other party which does not display smooth movement due to missing frames, then it is not possible to recognize the changes in the facial expression, the mouth movements, and the manual gestures, of the other party, and hence it is difficult to understand the contents of the sign language.

SUMMARY OF THE INVENTION

The present invention has been contrived in view of the foregoing circumstances, an object thereof being to improve image quality, without losing smoothness in the movement of the video image, even if the transmission bandwidth of the network is reduced.

In order to attain the aforementioned object, the present invention is directed to a moving picture real-time communications terminal, comprising: an input unit which inputs an RGB video image signal; a conversion unit which converts the RGB video image signal into a YUV video image signal including Y, U and V video image signals; a compression and encoding unit which digitally converts the YUV video image signal outputted from the conversion unit into moving picture data, and compresses and encodes the moving picture data; a communications unit which sends and receives the moving picture data compressed and encoded by the compression and encoding unit, in real time, to and from a communications terminal of another party connected through a network; a bandwidth estimation unit which estimates change in a bandwidth of the network; a switching circuit which connects and disconnects output paths of the U and V video image signals from the conversion unit to the compression and encoding unit; and a switching control unit which disconnects the output paths of the U and V video image signals by operating the switching circuit, in response to the change in the bandwidth estimated by the bandwidth estimation unit, wherein the compression and encoding unit increases a bit rate of compression and encoding of the Y signal, in accordance with disconnection of the output paths of the U and V video image signals.

Preferably, the conversion unit converts the RGB video image signal into the YUV video image signal having a YUV 4:2:0 format; and the compression and encoding unit increases the bit rate of the compression and encoding of the Y signal, up to a maximum of 1.5 times, in accordance with the disconnection of the output paths of the U and V video image signals.

In order to attain the aforementioned object, the present invention is also directed to a control method for a moving picture real-time communications terminal, comprising: an input unit which inputs an RGB video image signal; a conversion unit which converts the RGB video image signal into a YUV video image signal including Y, U and V video image signals; a compression and encoding unit which digitally converts the YUV video image signal outputted from the conversion unit into moving picture data, and compresses and encodes the moving picture data; a communications unit which sends and receives the moving picture data compressed and encoded by the compression and encoding unit, in real time, to and from a communications terminal of another party connected through a network; a bandwidth estimation unit which estimates change in a bandwidth of the network; and a switching circuit which connects and disconnects output paths of the U and V video image signals from the conversion unit to the compression and encoding unit, the method comprising the steps of: disconnecting the output paths of the U and V video image signals by operating the switching circuit, in response to the change in the bandwidth estimated by the bandwidth estimation unit; and increasing a bit rate of compression and encoding of the Y signal by the compression and encoding unit, in accordance with the disconnecting of the output paths of the U and V video image signals.

In order to attain the aforementioned object, the present invention is also directed to a computer readable medium having embodied thereon a control program for performing a moving picture real-time communications control by a moving picture real-time communications terminal comprising: an input unit which inputs an RGB video image signal; a conversion unit which converts the RGB video image signal into a YUV video image signal including Y, U and V video image signals; a compression and encoding unit which digitally converts the YUV video image signal outputted from the conversion unit into moving picture data, and compresses and encodes the moving picture data; a communications unit which sends and receives the moving picture data compressed and encoded by the compression and encoding unit, in real time, to and from a communications terminal of another party connected through a network; a bandwidth estimation unit which estimates change in a bandwidth of the network; and a switching circuit which connects and disconnects output paths of the U and V video image signals from the conversion unit to the compression and encoding unit, the control program comprising: a first code segment for a step of disconnecting the output paths of the U and V video image signals by operating the switching circuit, in response to the change in the bandwidth estimated by the bandwidth estimation unit;

and a second code segment for a step of increasing a bit rate of compression and encoding of the Y signal by the compression and encoding unit, in accordance with the disconnecting of the output paths of the U and V video image signals.

According to the present invention, the video image signal is switched from color to black and white by disconnecting the output paths of the U and V signals of the YUV video image signal, and the bit rate of the compression and encoding of the Y signal is increased, by an maximum amount corresponding to the amount, of U and V data removed by this disconnection of the U and V signals. For example, if the conversion unit is converting the RGB video image signal into the YUV video image signal having the YUV 4:2:0 format, then by switching to a black and white image, the bit rate of the compression and encoding for the Y signal alone is increased up to a maximum of 1.5 times. In other words, even if the bandwidth is reduced, by switching the video image signal that is to be compressed and encoded to a black and white image signal, and then increasing the bit rate of the compression and encoding of the Y signal, it is possible, conversely, to improve the image quality. Therefore, there is no reduction in the number of frames, or development of "jerkiness" in the movement of the image, in response to a reduction in the bandwidth, as in the related art.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein:

FIG. 3 is a flowchart showing the operations of the communication terminal.

DETAILED DESCRIPTION OF THE PREFERRED EMBODIMENTS

Figure 1:
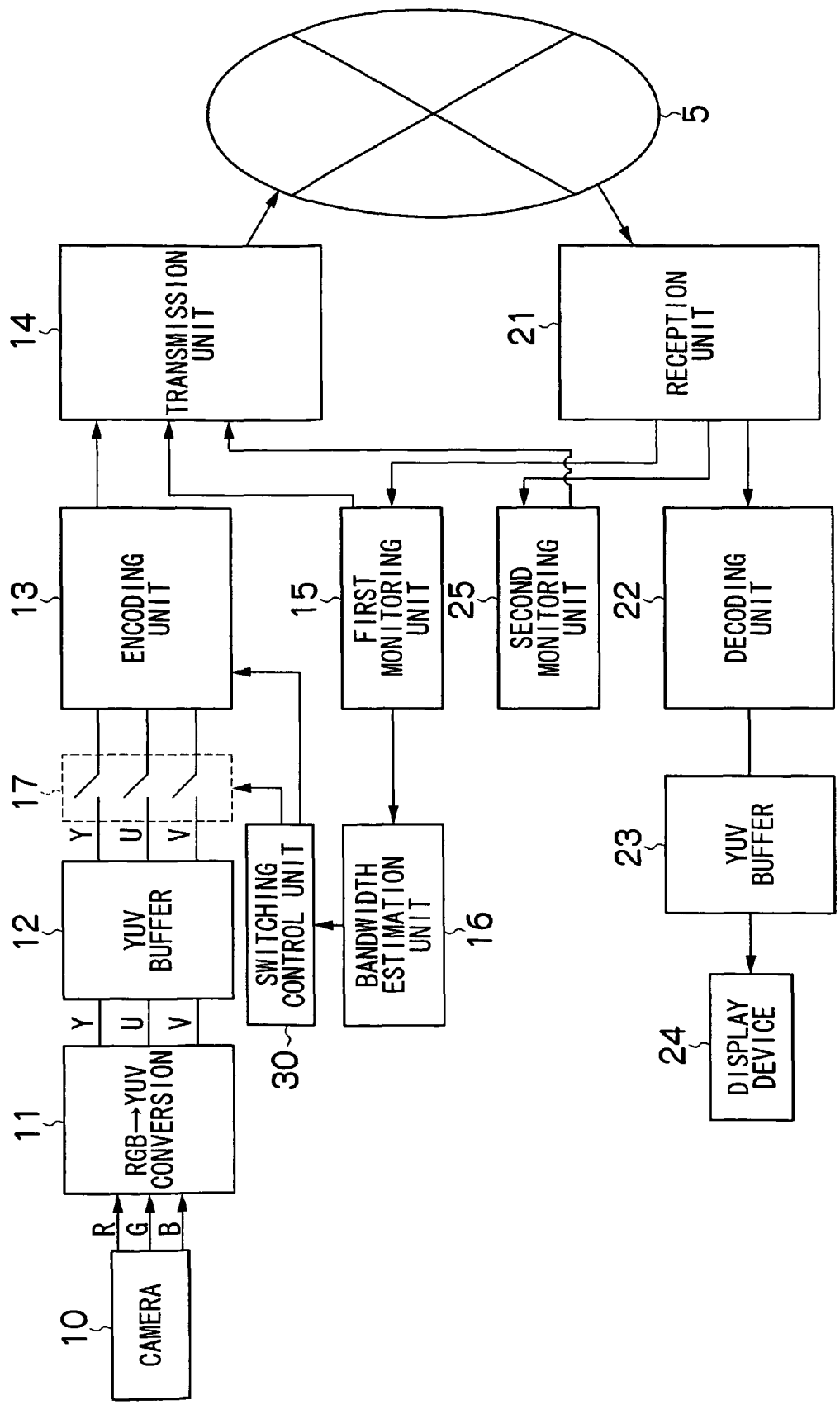
FIG. 1 is a block diagram of a real-time communications terminal according to an embodiment of the present invention.

FIG. 1 is a block diagram of a communications terminal 100 according to a preferred embodiment of the present invention. This communications terminal 100 is connected through a network 5 to the communications terminal 100 of another communicator, having a similar composition. The communications terminal 100 converts a video image signal to a moving picture signal digitally compressed and encoded and sends the moving picture signal in the form of packets to the communications terminal 100 of the other party. At the same time, the communications terminal 100 receives, decodes and reproduces a moving picture that has been similarly digitally compressed and encoded, from the other party.

In order to simplify the description, the communications terminals 100 are described as being connected in a one-to-one correspondence (namely, a unicast configuration), but a multicast or broadcast configuration can also be possible. The connection path between the communications terminals 100 is specified, for example, by an exchange server (not shown) constituted by a SIP (Session Initiation Protocol) server, using a network address (global IP (Internet Protocol) address, and the like), a port and an identifier (MAC (Media Access Control) address, or the like). When a session has been established between the communications terminals 100 by the exchange server, then the communications terminals 100 subsequently send and receive the data directly, without passing through the exchange server (i.e., in the peer-to-peer system).

The network 5 is constituted, for example, by a broadband network, such as ADSL (Asymmetric Digital Subscriber Line), a fiber-optic network (FTTH (Fiber-To-The-Home)), or a cable television network, a narrow-band network, such as ISDN (Integrated Services Digital Network), or IEEE 802.xx-compatible wireless communications, such as UWB (Ultra Wide Band) and Wi-Fi (Wireless Fidelity), or the like.

In the present embodiment, the network 5 is supposed to be a "best-effort" network, in which it cannot be guaranteed that a bandwidth of a prescribed value (communications speed) can be ensured at all times. In the network 5, the nominal maximum bandwidth is substantially restricted by various factors, such as the distance between the telephone exchange and the home, the communications speed between the ADSL modems, increase and decrease in traffic, the communications environment of the other party of the session, and the like. In many cases, the effective value is a fraction of the nominal value. The bandwidth of the network 5 is expressed in terms of bits per second (bps). For example, the nominal bandwidth of FTTH is generally 100 Mbps, but in actual practice, it may be limited to a few hundred kbps.

The communications terminal 100 comprises: a signal conversion unit 11, which converts an R, G; B video image signal inputted from a camera 10, or the like, into a video image signal comprising Y (luminosity signal), U (color difference signal Cb), and V (color difference signal Cr); a buffer 12, which temporarily accumulates the YUV video image signal transferred to an encoding unit 13; the encoding unit 13, which digitally converts the YUV video image signal outputted from the buffer 12 into moving picture data, and then compresses and encodes this digital data by means of an MPEG-4 method (MPEG stands for Moving Picture Experts Group), or the like; and a transmission unit 14, which converts the moving picture data compressed and encoded by the encoding unit 13, into packets, and transmits same to the communications terminal 100 of another party.

Given the fact that the characteristics of the human eye are such that it is sensitive to changes in luminosity but insensitive to changes in color, then the conversion of the RGB signal into YUV video image signal by the signal conversion unit 11 is carried out in order to reduce the amount of color information while assigning a larger amount of information to the luminance Y. This conversion is known as YUV 4:4:4, YUV 4:2:2, YUV 4:2:0, or the like, according to the sampling ratios of the Y, U and V signals.

YUV 4:4:4 means that the Y, U, V signals are converted at the same ratio. More specifically, an RGB signal which represents color by means of a total of 8+8+8=24 bits, namely, 8 bits each for R, G and B, per pixel, is converted into coordinates on a YUV system, in which the luminosity Y, and color differences U and V, are acquired for all four pixels of four pixels aligned in the horizontal direction. The number of bits per pixel of YUV signal after conversion to a YUV 4:4:4 format is 8+8+8=24 bits (compression ratio 1), and hence the amount of data per pixel does not change. The YUV 4:4:4 format is used for special fields, such as medical use, movies, and the like.

In the YUV 4:2:2 format, the data volumes of the color difference signals U and V constituting a pixel are respectively thinned to ½ in the horizontal direction. In other words, the luminance Y is acquired for all of the four pixels in the horizontal direction, but the color difference signals U and V are only acquired every two pixels. Therefore, the number of bits per pixel of the YUV signal after conversion to the YUV 4:2:2 format, is 8+4+4=16 bits (namely, a compression rate of ⅔). The YUV 4:2:2 format is used generally in television studios, and other professional uses.

In the YUV 4:2:0 format, the color difference signals U and V in the YUV 4:2:2 format are thinned to ½ in the vertical direction. Therefore, the number of bits per pixel of the YUV signal after conversion to the YUV 4:2:0 format, is 8+2+2=12 bits (namely, a compression rate of ½). The YUV 4:2:0 format is commonly used in encoders using the MPEG-4 method, or the like, and it reduces the data volume by ½ per pixel.

Whatever the format of the YUV video image signal converted by the signal conversion unit 11, either YUV 4:4:4, YUV 4:2:2, or YUV 4:2:0, the same theory is established, but the most beneficial effects are obtained in the case of the YUV 4:4:4 format or the YUV 4:2:2 format. Hereinafter, unless specified otherwise, the following descriptions relate to the YUV 4:2:0 format.

The data volume of the moving picture data compressed and encoded by the encoding unit 13 is also dependent on the noise in the video image signal outputted from the camera 10, the resolution of the video image signal, and the number of frames per second (frame rate), and the like.

The compressed data volume (number of packets) generated by the MPEG-4 or other type of encoder is principally dependent on the following image parameters:

the qualities of the image capture device: camera characteristics, captured image qualities (noise), and the like;
the image resolution: number of pixels in the vertical and lateral directions;
frame rate: number of frames per second;
GOP (group of pictures) length: length (number of frames) between two intra frames; and
estimated bit rate: estimated current bandwidth of communications path (this temporally varies, since it is a best effort communications path).

Here, the object of the present embodiment is considered with respect to a case where it is sought to transmit the movement and shape of an object more accurately, rather than the color information. For example, considering an application in which persons with hearing difficulties perform video communications by using sign language, then the important element is the sign language, in other words, manual gestures and facial expression. In this case, it is desirable to depict the movement clearly, even in the form of black and white images, rather than depicting degraded color images.

If the bandwidth bit rate has declined, then in the case of a standard video telephone, or the like, a common method for reducing the data volume is to reduce the frame rate. For example, the rate becomes 15 frames per second. However, 15 frames per second is not sufficient to display smooth manual gestures, and a frame rate of 30 frames per second, similar to television, is desirable.

The packet transmission protocol of the transmission unit 14 uses RTP (Real-Time Transport Protocol), which is a UDP (User Datagram Protocol) type commonly used in the transmission of streaming media, and the like. RTP comprises an RTP header, which is a generic header for conveying real-time information, and an RTP payload, which includes the actual moving picture data. The RTP payload is specified by the RFC (Request For Comments) for each data format, such as MPEG-1, MPEG-2, MPEG-4, H264, H264/MPEG-4 AVC, and so on, but the present method is not dependent on the compression method used for the digital moving pictures.

In UDP, in contrast to TCP (Transmission Control Protocol), packet loss countermeasures and retransmission control, and other such operations, are not carried out. Therefore, it is used in conjunction with a communications status report based on RTCP (RTP Control Protocol). This report is obtained by a first monitoring unit 15.

Figure 2:
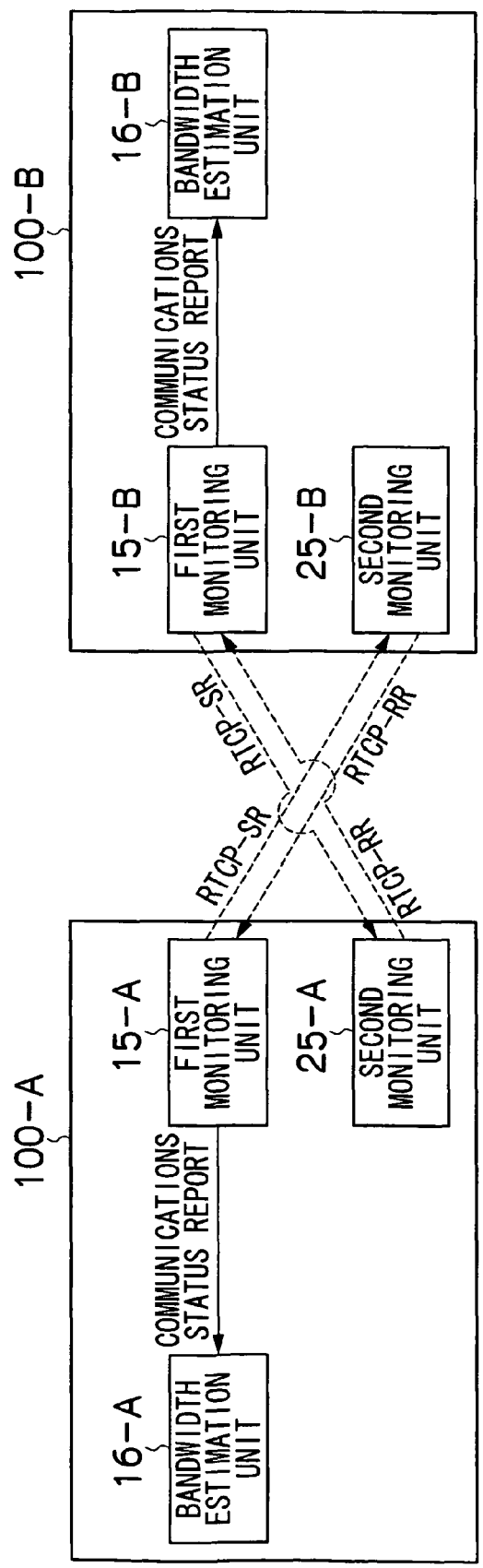
FIG. 2 is a diagram showing a conceptual view of the transmission and reception of RTCP SR and RTCP RR packets, by first monitoring units and second monitoring units in the communication terminals.

More specifically, with reference to FIG. 2, the first monitoring unit 15-A provided in the communications terminal 100-A (one of the communications terminals 100) sends an SR (Sender Report) type RTCP packet (RTCP SR) (a monitoring packet) to the communications terminal 100-B (the other of the communications terminals 100) of the other party to the session, at regular intervals (namely, every time a prescribed time period has passed). The first monitoring unit 15-A stores a time stamp indicating the transmission timing of the RTCP SR packets, and the number of transmitted packets, which is the total number of RTCP SR packets sent within a fixed time period.

The communications terminal 100 comprises a second monitoring unit 25. When RTCP SR packets are received from the communications terminal 100-A, the second monitoring unit 25-B provided in the communications terminal 100-B calculates the number of lost RTCP SR packets received, by finding the sequence numbers of the sequence number fields in the headers of the RTCP SR packets. The second monitoring unit 25-B sends an RR (Receiver Report) type RTCP packet (RTCP RR) stating the number of lost packets, to the communications terminal 100-A. The RTCP RR packet also states the time period from the reception of the RTCP SR packet until the transmission of the RTCP RR packet (for the sake of convenience, this time period is called the "response time").

Upon receiving the RTCP RR from the second monitoring unit 25-B, the first monitoring unit 15-A calculates the RTT (Round Trip Time), which is the time period from the transmission time of the RTCP SR packet until the reception time of the RTCP RR packet, minus the response time. Furthermore, the first monitoring unit 15-A refers to the number of RTCP SR packets transmitted, and the number of lost packets in the RTCP RR, and it calculates the packet loss rate within the prescribed time period, which is equal to "(number of lost packets)/(number of transmitted packets)". The first monitoring unit 15-A sends the RTT and the packet loss rate, in the form of a communications status report, to the bandwidth estimation unit 16-A.

It is thought that a suitable interval at which to issue the monitoring packets is ten seconds to several tens of seconds, but if estimated by means of a single trial of a monitoring packet, it is often impossible to ascertain the network status accurately, and therefore, estimation accuracy is improved if the issuance of monitoring packets is divided into a plurality of operations, and an estimate is made by finding the average value thereof. If the number of monitoring packets becomes large, then this itself becomes a cause of narrowing of the bandwidth, and therefore, desirably, the monitoring packets occupy 2% to 3% of the total communications data volume.

Apart from the method described above, it is also possible to obtain a communications status report by using various QoS (Quality of Service) control technologies for the bandwidth estimation unit 16.

Furthermore, the communications terminal 100 comprises: a reception unit 21, which receives compressed and encoded packets of moving picture data sent in packets by the communications terminals 100 of the other party; a decoding unit 22, which decodes and reproduces the received video image signal into the YUV video image signal; a buffer 23, which accumulates the YUV video image signal reproduced by the decoding unit 22; and a display device 24, which reproduces and displays a video image from the YUV video image signal outputted from the buffer 23.

If the transmission frame rate is reduced when it is estimated that there has been a reduction in the transmission bandwidth of the network 5, as in the related art, in other words, if the frames are thinned out, then the movement of the object in the video image becomes rough and jerky, rather than smooth. This problem, which occurs frequently in real-time video image transmission, is a particular issue in cases where it is sought to transmit the movement and shape of the object accurately, rather than the color information. For example, if persons with hearing difficulties are performing sign language, then if they are not able to clearly grasp each other's manual gestures and facial movements, this will inevitably present a major obstacle to communication. Consequently, in the communications terminal 100 of the present embodiment, priority is given to switching the moving picture data that is to be transmitted, from a color image to a black and white image, rather than thinning out the frames or reducing the overall image quality by simply reducing the compression bit rate for the whole image, in response to an estimated reduction in the transmission bandwidth of the network 5.

In other words, the communications, terminal 100 comprises: a switching circuit 17, which connects and disconnects the output paths of the U and V video image signals from the buffer 12 to the encoding unit 13; and a switching control unit 30, which controls the operation of the switching circuit 17. The switching control unit 30 activates the switching circuit 17 and disconnects the output paths of the U and V video image signals, as and when the bandwidth estimation unit 16 estimates that there has been a reduction in the transmission bandwidth. If the output paths of the U and V video image signals are disconnected, then the video image signal to be encoded includes the Y signal only, and hence the video image signal changes from color to black and white.

Moreover, in accordance with the disconnection of the output paths of the U and V video image signals, the encoding unit 13 increases the encoding bit rate of the Y signal, taking as an upper limit for this increase the data volume removed by the disconnection of the output paths of the U and V video image signals. More specifically, in the case of the YUV 4:2:0 format, when the output paths of the U and V video image signals are disconnected, 4 bits of 12 bits per pixel are removed, in other words, there is approximately a 33% reduction in the data volume. In the case of the YUV 4:2:2 format, 8 bits of data are removed in every 16 bits per pixel, which corresponds a 50% data reduction rate. In the case of the YUV 4:4:4 format, 16 bits of data are removed in every 24 bits per pixel, which corresponds a 67% data reduction rate. Therefore, it is possible to increase the encoding bit rate of the Y signal by a maximum of 1.5 times, in the case of the YUV 4:2:0 format, a maximum of 2.0 times in the case of the YUV 4:2:2 format, and a maximum of 3.0 times in the YUV 4:4:4 format.

FIG. 3 is a flowchart showing the above-described operation. If the bandwidth estimation unit 16 estimates that the transmission bandwidth has reduced ("YES" at S1), then the switching control unit 30 activates the switching circuit 17 and disconnects the output paths of the U and V video image signals (S2). The encoding unit 13 increases the encoding bit rate for the Y signal, using as an upper limit for this increase corresponding to the data volume removed by disconnecting the output paths of the U and V video image signals (S3). This sequence of operation in steps S1 to S3 are repeated according to requirements.

In the case of the YUV 4:2:0 format, for example, the encoding bit rate of the Y signal is increased by an maximum of 1.5 times (=12 bits/8 bits), which is the ratio of the data volume per pixel saved by the disconnection of the U and V signals. Although the video image changes to a black and white image, the image quality of the moving picture is improved since the bit encoding rate of the Y, signal is increased. In other words, even if the bandwidth is 400 kbps, for example, by switching to a black and white image, it becomes theoretically possible to encode a moving picture at a maximum bit rate of 600 kbps, and thus even if the bandwidth declines, it is still possible to transmit a moving picture having 50% improved quality. Since the frame rate is not reduced in response to a reduction in the bandwidth as in the related art, the image does not become rough and jerky when the bandwidth reduces.

As and when the bandwidth estimation unit 16 estimates that the transmission bandwidth has increased, the switching control unit 30 activates the switching circuit 17 and reconnects the output paths of the U and V video image signals, and the encoding bit rate of the YUV signal is returned to that of the original color moving picture signal. In other words, if there is a reduction in the bandwidth, then the image is switched to a black and white image, and if the bandwidth improves again, then a color video image is transmitted at the original encoding bit rate.

The point in the bandwidth at which to switch the bit rate is set according to each individual system, but judging on the basis of current compression technologies and conditions in the Internet, the threshold value of the bandwidth is preferably between 300 kbps and 500 kbps. In the present embodiment, it is set to 400 kbps.

Furthermore, a method and a program for implementing the steps S1 to S3 described above in the communications terminal 100 are also included in the present invention. Moreover, it is also possible to realize the switching circuit, and the like, described in the present embodiment, by means of control implemented by a program.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A moving picture real-time communications terminal, comprising:

an input unit which inputs an RGB video image signal;

a conversion unit which converts the RGB video image signal into a YUV video image signal including Y, U and V video image signals;

a compression and encoding unit which digitally converts the YUV video image signal outputted from the conversion unit into moving picture data, and compresses and encodes the moving picture data;

a communications unit which sends and receives the moving picture data compressed and encoded by the compression and encoding unit, in real time, to and from a communications terminal of another party connected through a network;

a bandwidth estimation unit which estimates change in a bandwidth of the network;

a switching circuit which connects and disconnects output paths of the U and V video image signals from the conversion unit to the compression and encoding unit; and a switching control unit which disconnects the output paths of the U and V video image signals by operating the switching circuit, in response to the change in the bandwidth estimated by the bandwidth estimation unit, wherein the compression and encoding unit increases a bit rate of compression and encoding of the Y signal, in accordance with disconnection of the output paths of the U and V video image signals.

2. The moving picture real-time communications terminal as defined in claim 1, wherein:

the conversion unit converts the RGB video image signal into the YUV video image signal having a YUV 4:2:0 format; and the compression and encoding unit increases the bit rate of the compression and encoding of the Y signal, up to a maximum of 1.5 times, in accordance with the disconnection of the output paths of the U and V video image signals.

3. A control method for a moving picture real-time communications terminal, comprising: an input unit which inputs an RGB video image signal; a conversion unit which converts the RGB video image signal into a YUV video image signal including Y, U and V video image signals; a compression and encoding unit which digitally converts the YUV video image signal outputted from the conversion unit into moving picture data, and compresses and encodes the moving picture data; a communications unit which sends and receives the moving picture data compressed and encoded by the compression and encoding unit, in real time, to and from a communications terminal of another party connected through a network; a bandwidth estimation unit which estimates change in a bandwidth of the network; and a switching circuit which connects and disconnects output paths of the U and V video image signals from the conversion unit to the compression and encoding unit, the method comprising the steps of:

disconnecting the output paths of the U and V video image signals by operating the switching circuit, in response to the change in the bandwidth estimated by the bandwidth estimation unit; and increasing a bit rate of compression and encoding of the Y signal by the compression and encoding unit, in accordance with the disconnecting of the output paths of the U and V video image signals.

4. A computer readable medium having embodied thereon a control program for performing a moving picture real-time communications control by a moving picture real-time communications terminal comprising: an input unit which inputs an RGB video image signal; a conversion unit which converts the RGB video image signal into a YUV video image signal including Y, U and V video image signals; a compression and encoding unit which digitally converts the YUV video image signal outputted from the conversion unit into moving picture data, and compresses and encodes the moving picture data; a communications unit which sends and receives the moving picture data compressed and encoded by the compression and encoding unit, in real time, to and from a communications terminal of another party connected through a network; a bandwidth estimation unit which estimates change in a bandwidth of the network; and a switching circuit which connects and disconnects output paths of the U and V video image signals from the conversion unit to the compression and encoding unit, the control program comprising:

a first code segment for a step of disconnecting the output paths of the U and V video image signals by operating the switching circuit, in response to the change in the bandwidth estimated by the bandwidth estimation unit; and a second code segment for a step of increasing a bit rate of compression and encoding of the Y signal by the compression and encoding unit, in accordance with the disconnecting of the output paths of the U and V video image signals.

\* \* \* \* \*